June 2, 1959   D. S. WIMPRESS   2,889,117
TURBINE SPEED CONTROL
Filed May 13, 1955   2 Sheets-Sheet 1

DONALD S. WIMPRESS,
INVENTOR.

BY John H. T. Wallace

June 2, 1959  D. S. WIMPRESS  2,889,117
TURBINE SPEED CONTROL
Filed May 13, 1955  2 Sheets-Sheet 2
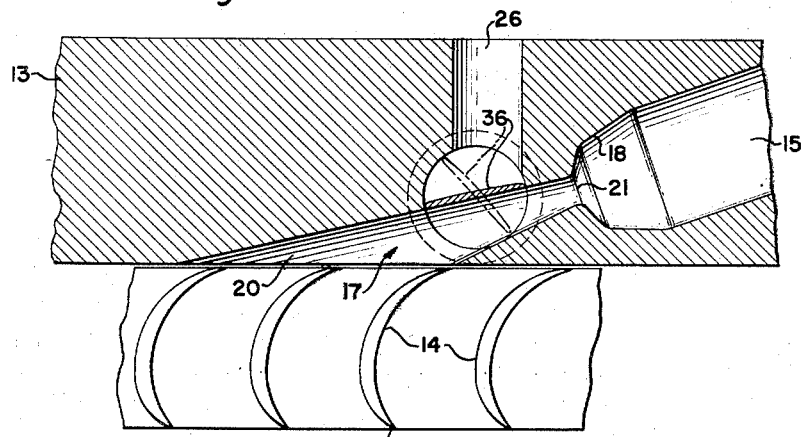
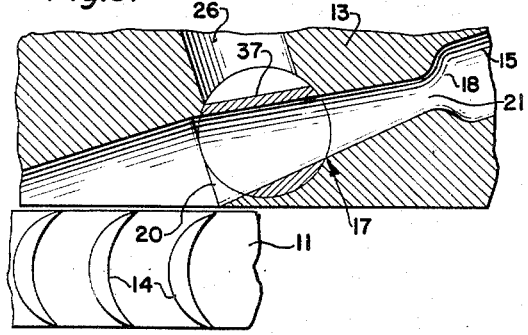
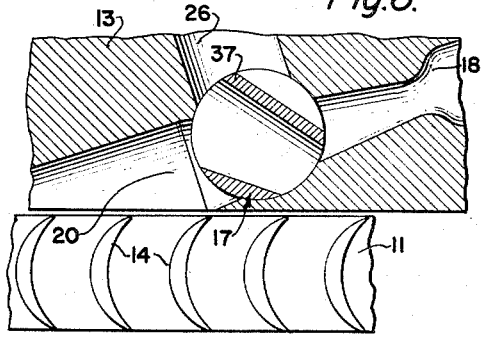
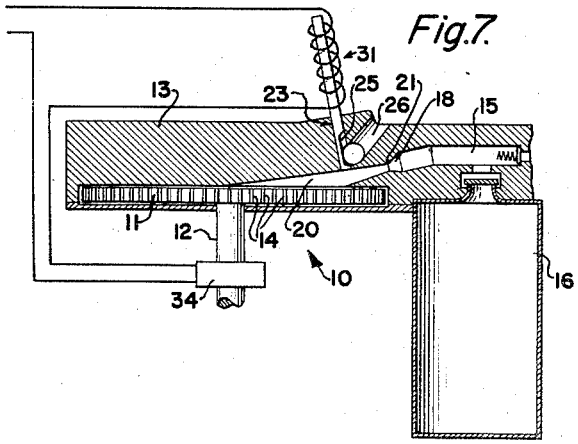
DONALD S. WIMPRESS,
INVENTOR.
BY John H. J. Wallace United States Patent Office 2,889,117
Patented June 2, 1959

2,889,117

TURBINE SPEED CONTROL

Donald S. Wimpress, Los Angeles, Calif., assignor to The Garrett Corporation, Los Angeles, Calif., a corporation of California Application May 13, 1955, Serial No. 508,249

7 Claims. (Cl. 239—124)

This invention relates generally to power units of the type having nozzles or equivalent means for creating jet streams of fluid, such streams being employed for any of a variety of purposes, such as, applying torque to the wheels of turbines, operating jet pumps, applying driving and control thrusts to reaction operated fluid borne devices and other similar apparatus. More particularly, the invention is directed to apparatus for controlling the flow of gases to in turn govern the operation of a device driven or controlled by one or more jet streams.

In certain fields, such as in aerial vehicles, it has been found desirable to provide a turbine for driving a generator to furnish the electric power employed to actuate certain mechanisms in the vehicle. Also, it has been found desirable to provide a self-contained source of gas or other fluid for operating the turbine in such vehicle, a gas generator with a constant rate of gas generation being preferred because of the simplicity of design and the fact that the gas is continuously available. The use of a generator of this type, however, poses a problem in that if the gas is not utilized or disposed of it may damage the vehicle or cause failure thereof before its mission is completed. An object of the present invention, therefore, is to provide a simple control system for a turbine, or the power source thereof, which will improve the operation of the turbine by governing the speed of rotation of the turbine wheel through the interruption and/or by-passing of the motivating gas without loss of pressure in the gas generating portion of the device.

Another object of the invention is to provide a turbine having a novel jet nozzle and valve means actuated by a governor-controlled mechanism to spoil the flow of gas from the nozzle and/or divert all or a portion thereof to exhaust.

Another object of the invention is to provide a turbine of the type having a nozzle for converting gas under pressure into a jet stream of suitable velocity, with a relatively simple valve disposed in the outlet portion of the nozzle so that fluid flowing through such outlet portion at high velocity but low pressure will have no tendency to escape to the atmosphere when the valve is in position to permit turbine operation, the valve being movable to a position to interrupt or spoil the high velocity jet and divert the gas to exhaust, means, controlled by a speed sensing governor, being provided to effect the operation of the valve and consequently to control the speed of the turbine.

A further object of the invention is to provide a turbine of the type having a nozzle for directing a jet stream of hot gases against vanes or buckets on the turbine wheel, with a diverter valve pin which is guided for movement substantially at right angles into the jet stream to break it up, the valve pin being relieved or grooved to form a passage to conduct some of the gases from the jet stream to an outlet passage and thus control the rotation of the wheel without causing undue heating thereof.

Another object of the invention is to provide a turbine of the type having a rotatable wheel and vanes or buckets thereon, with a converging-diverging nozzle for converting gas, supplied under pressure by a generator, into a jet stream and to provide the diverging part of such nozzle with means for intermittently interrupting the jet stream and diverting at least a portion thereof to exhaust to control the rate of operation of the turbine, the jet stream interrupting means being shaped to provide a passage to exhaust when in position to interrupt the jet stream and to close such passage when in position to permit the jet stream to impinge on the buckets or vanes of the turbine wheel.

Other objects and advantages will be apparent from the following description taken in connection with the accompanying drawings in which several forms of the invention have been illustrated.

In the drawings:

Figure 4 is a vertical sectional view through a modified form of nozzle.

Figures 5 and 6 are similar views of a further modified form of nozzle, showing movable parts thereof in different positions of operation.

Figure 7 is a diagrammatic view of the system for generating gas employed in driving the turbine, the control mechanism also being diagrammatically illustrated.

Figure 3:
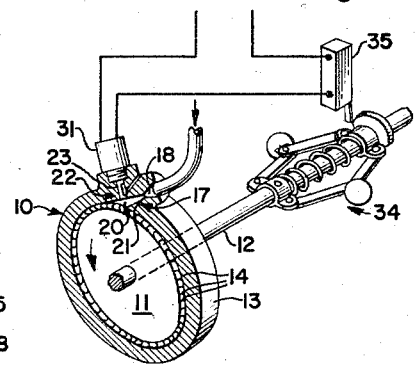
Figure 3 is a diagrammatic view illustrating centrifugal means for governing operation of the control mechanism.

Referring more particularly to the drawings, and especially to Figures 3 and 7, the turbine is designated generally by the numeral 10 and includes a wheel 11 mounted on a shaft 12, the latter being supported for rotation in suitable bearings, not shown. The wheel is arranged in a casing 13 and is provided with suitable vanes or buckets 14 adjacent to the periphery of the wheel. These buckets receive or are impinged by fluid from a suitable source to effect the rotation of the wheel and shaft. In the present instance, the invention is directed to improvements in nozzles employed to direct a jet of fluid against the vanes or buckets. The invention also contemplates means for controlling the flow of fluid to, in turn, control the rate of rotation of the turbine wheel.

In all forms of the invention shown, the nozzle is of the so-called converging-diverging type. It is arranged in a gas passage 15 which, as shown in Figure 7, communicates with the outlet of a bottle type gas generator 16 of any suitable type, the one diagrammatically illustrated in Figure 7 being suitable for burning solid fuel. As the fuel is burned, gas will be generated and will flow through the gas passage 15 to the nozzle 17. In all forms illustrated, the nozzle includes a converging entrance portion 18 and a diverging outlet portion 20, these portions being connected by a restricted throat 21. The degrees of convergence and divergence of the inlet and outlet portions of the nozzle have been calculated to cause the gas flowing through the throat 18 from passage 15 under pressure to be converted into a jet of suitable velocity and to reduce the pressure of the gas after it has passed the throat 21 to substantially atmospheric pressure; this jet of fluid flowing through the outlet portion of the nozzle impinges the vanes or buckets on the turbine wheel and causes the wheel to rotate at high speed.

As pointed out in the objects, mechanism has been provided for spoiling the jet of gas at predetermined intervals to control the rate of operation of the turbine wheel. One form of such mechanism has been illustrated in detail in Figures 1 and 2. This form of jet spoiling mechanism, designated generally by the numeral 22, includes a valve pin or rod 23, which is guided by a sleeve 24 for movement, at substantially right angles, into and out of the stream of gas flowing from the throat 21. When the pin or rod is disposed within the outlet passage of the nozzle, it will spoil the stream of gas and will create shock waves which convert the velocity of the gas issuing from the throat 21 into pressure, provision being made to vent this pressure to exhaust by relieving the pin, as at 25, to provide, in cooperation with the sleeve 24, a channel which conducts the gas from the outlet portion of the nozzle to an exhaust passage, indicated by the numeral 26, leading to the atmosphere. The pin is disposed for sliding movement in the sleeve 24 and is held against rotation by a transversely extending key pin 27 which projects through the pin 23 and into a slot extending longitudinally of the sleeve 24. The pin 23 is withdrawn from an inserted position, shown in Figure 2, to a retracted position, shown in Figure 1, by spring means including a relatively light spring 28 and a heavier coil spring 30.

The casing 13 of the turbine is provided with a threaded, or otherwise suitably formed, opening for the reception of means for supporting a solenoid 31 employed to move the pin 23 in a direction opposite that in which it is moved by the springs 28 and 30. The formation of the opening for the solenoid mounting provides a shoulder 32 against which the springs 28 and 30 abut at one end, the pin 23 being provided with a collar 33 for engaging the opposite ends of the springs. In the form of the invention illustrated in Figures 1 and 2, the light spring 28 engages both the shoulder 32 and the collar 33 when the spring is fully expanded. The fully expanded length of spring 30, however, is insufficient to cause it to engage the collar 33 when the pin 23 is in its fully retracted position. By this arrangement, only slight opposition is offered to the movement of the pin 23 during its initial insertion into the nozzle. After this movement has been initiated, however, collar 33 will engage spring 30 and further movement will be yieldably resisted. The spring 30 will be slightly compressed and will absorb the shock incident to the interruption of the movement of the pin and core of the solenoid.

It is a known fact that solenoids exert maximum power as the core of the solenoid approaches its final stage of movement. Spring 30 has, therefore, been made long enough to engage the collar 33 at a predetermined stage of movement, in advance of the final position of the core, so that the maximum power of the solenoid will be exerted against the force of the heavier spring 30. The force of this spring will then serve to quickly initiate the movement of the pin 23 during its retraction.

One of the features of the present invention is to employ the pin 23, which constitutes an interrupter or diverter valve, to control the rate of operation of the turbine wheel. To accomplish this object, the shaft 12 is provided with a suitable governor or speed sensing device, indicated diagrammatically in Figure 3 as a flyball type governor 34, which, when the speed of rotation of the wheel approaches a predetermined value, will cause the actuation of a microswitch 35 to complete an electrical circuit including the solenoid 31. When the solenoid 31 is energized, the pin 23 will be moved into the gas stream to spoil the velocity of the stream and interrupt the application of power to the turbine wheel. When the speed of rotation has diminished a predetermined amount, switch 35 will be opened to de-energize the solenoid 31, and springs 28 and 30 will then effect the withdrawal of the pin 23 from the path of movement of the jet stream issuing from throat 21 and rotative power will again be imparted to the turbine wheel.

Figure 1:
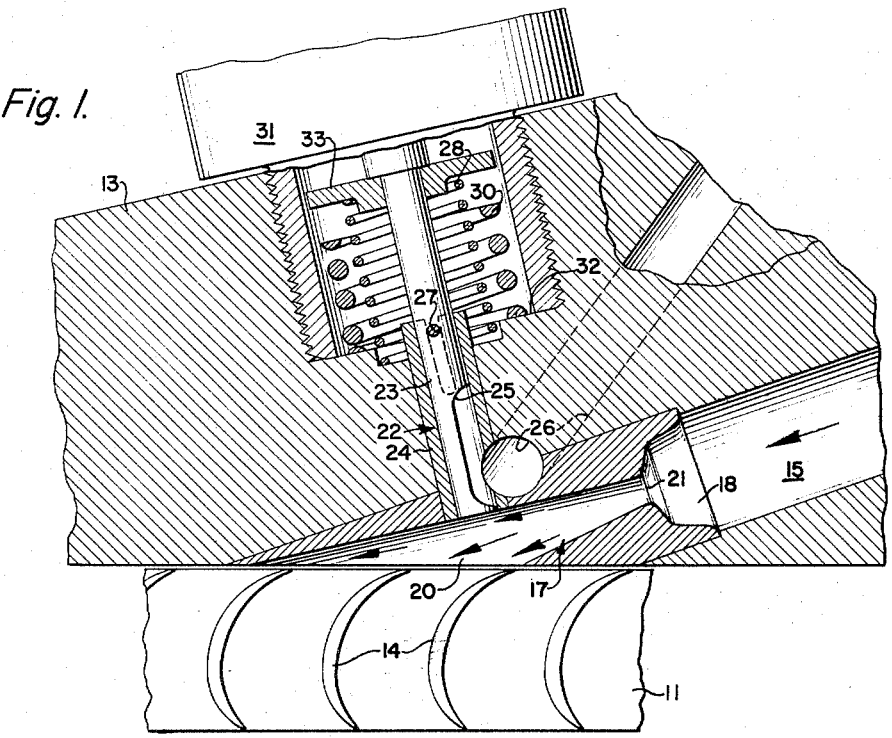
Figure 1 is a vertical sectional view taken through the nozzle portion of an impulse turbine, the nozzle being formed in accordance with the present invention.
Figure 2:
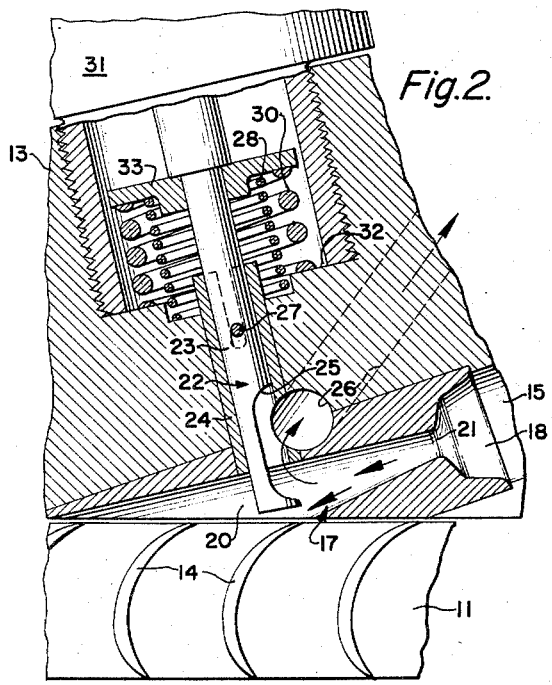
Figure 2 is a view similar to Figure 1, showing the control mechanism associated with the nozzle in different positions of operation.

It will be noted from Figure 1 that pin 23 is stopped in its outward movement to dispose the end of the pin flush with the inner surface of the outlet portion of the nozzle. The end portion of the pin is so shaped that the exhaust passage will be closed when the pin occupies its outer position. By locating the diverter pin or valve in the outlet section of the nozzle, where the jet stream moves at high velocity and under substantially atmospheric pressure, no sealing problem will be involved. Since there will be no tendency for the fluid to flow past the end of the valve to the exhaust passage, there will be no deposit of the products of combustion around the valve pin and it will move without undue resistance.

In Figures 4-6, inclusive, modified forms of gas diverting means have been illustrated. In these figures the valves are of the rotatable type, valve 36, in Figure 4, including a section which may be turned from a position constituting a part of the wall of the outlet portion of the nozzle to a position obstructing fluid flow through the outlet section and directing this fluid to the exhaust passage. Suitable means may be provided for effecting the rotation of the valve 36.

The valve 37, shown in Figures 5 and 6, is similar to the valve 36, in that it is disposed for rotation about an axis extending transversely of the nozzle. The valve 37, however, includes portions which, in one position of the valve, constitute part of the nozzle outlet and, in another position, serve to direct fluid issuing from the throat of the nozzle, to exhaust; the volume of fluid bypassed in this manner may be controlled by the degree of rotary movement of the valve.

It should be obvious that by controlling the degree of rotary movement of valves 36 and 37, or the extent of movement of pin 23 into the nozzle, the degree of interruption of the jet stream may be controlled. By so controlling the jet stream, the rate of operation of the turbine wheel may also be controlled within close limits.

The control mechanism forming the subject matter of this invention is particularly adaptable for use with fluid pressure generators of the type wherein pressure generation is initiated and then permitted to continue without further control or attention. The apparatus is protected against excessive pressure by venting the gas to exhaust during periods of non-use. By locating the control valves at the downstream side of the nozzle throat, gas pressure will be maintained and a quicker response by the turbine wheel will be secured when flow of the jet stream is resumed.

While the invention has been illustrated in several forms, it is obvious that many minor changes may be made in the construction and relation of parts without departing from the spirit and scope of the invention.

I claim:

1. Apparatus for converting fluid under pressure to a jet stream and controlling such jet stream comprising: a nozzle with a converging inlet portion for communication with a source of fluid under pressure, said nozzle having a diverging outlet portion connected with said inlet by a restricted neck; an exhaust passage communicating with ambient atmosphere; and jet stream spoiling means having an element guided for movement transversely of said nozzle into and out of said outlet portion between the outlet end thereof and said restricted neck, said element being shaped to establish communication between said nozzle and said exhaust passage when moved into said outlet portion.

2. Apparatus for converting fluid under pressure to a jet stream and controlling such jet stream comprising: a nozzle with a converging inlet portion for communication with a source of fluid under pressure, said nozzle having a diverging outlet portion connected with said inlet by a restricted neck; an exhaust passage communicating with ambient atmosphere; jet stream spoiling means having a pin guided for movement transversely of said nozzle into and out of said outlet portion between the outlet end thereof and said restricted neck, said pin being shaped to establish communication between said nozzle and said exhaust passage when moved into said outlet portion; and means for initiating rapid outward movement of said pin to restore the jet stream.

3. Apparatus for converting fluid under pressure to a jet stream and controlling such jet stream comprising: a nozzle with a converging inlet portion for communication with a source of fluid under pressure, said nozzle having a diverging outlet portion connected with said inlet by a restricted neck; an exhaust passage communicating with ambient atmosphere; jet stream spoiling means having a pin guided for movement transversely of said nozzle into and out of said outlet portion between the outlet end thereof and said restricted neck, said pin being relieved to form a passage establishing communication between said nozzle and said exhaust passage in the innermost position of said pin; resilient means tending to resist movement of said pin into said nozzle; and means for moving said pin in opposition to said resilient means.

4. Apparatus for converting fluid under pressure to a jet stream and controlling such jet stream comprising: a nozzle with a converging inlet portion for communication with a source of fluid under pressure, said nozzle having a diverging outlet portion connected with said inlet by a restricted neck; an exhaust passage communicating with ambient atmosphere; jet stream spoiling means having a pin guided for movement transversely of said nozzle into and out of said outlet portion between the outlet end thereof and said restricted neck, said pin being relieved to form a passage establishing communication between said nozzle and said exhaust passage in the innermost position of said pin; resilient means tending to resist movement of said pin into said nozzle; a second resilient means augmenting the first mentioned resilient means following predetermined movement of said pin into said nozzle; and means for moving said pin in opposition to said resilient means.

5. Apparatus for converting fluid under pressure to a jet stream and controlling such jet stream comprising: a nozzle with a converging inlet portion for communication with a source of fluid under pressure, said nozzle having a diverging outlet portion connected with said inlet by a restricted neck; an exhaust passage communicating with ambient atmosphere; jet stream spoiling means having a pin guided for movement transversely of said nozzle into and out of said outlet portion between the outlet end thereof and said restricted neck, said pin being relieved to form a passage establishing communication between said nozzle and said exhaust passage in the innermost position of said pin; resilient means tending to resist with a predetermined force initial movement of said pin into said nozzle and to resist final movement thereof with additional force; and electro-responsive means for moving said pin in opposition to said resilient means.

6. Apparatus for converting fluid under pressure to a jet stream and controlling such jet stream comprising: a nozzle with a converging inlet portion for communication with a source of fluid under pressure, said nozzle having a diverging outlet portion connected with said inlet by a restricted neck; an exhaust passage communicating with ambient atmosphere; jet stream spoiling means having a pin guided for movement into and out of the outlet portion of said nozzle in a path extending substantially at right angles to the axis of the nozzle, the portion of said pin entering said nozzle being relieved on the side facing said restricted neck to establish communication between the interior of said nozzle and said exhaust passage when the pin is disposed in said nozzle; and means for moving said pin into and out of said nozzle.

7. Apparatus for converting fluid under pressure to a jet stream and controlling such jet stream comprising: a nozzle with a converging inlet portion for communication with a source of fluid under pressure, said nozzle having a diverging outlet portion connected with said inlet by a restricted neck; an exhaust passage communicating with ambient atmosphere; jet stream spoiling means having a pin guided for movement into and out of the outlet portion of said nozzle in a path extending substantially at right angles to the axis of the nozzle, the portion of said pin entering said nozzle being relieved in spaced relation from the end of the pin and on the side facing said restricted neck to establish communication between the interior of said nozzle and said exhaust passage when the pin is disposed in said nozzle, the unrelieved portion at the end of said pin forming a part of the diverging outlet portion of said nozzle when said pin is withdrawn from said nozzle; and means for moving said pin into and out of said nozzle.

References Cited in the file of this patent

UNITED STATES PATENTS

| | | |
|---|---|---|
| 1,966,712 | Fisher et al. | July 17, 1934 |
| 2,370,260 | Robison | Feb. 27, 1945 |
| 2,380,839 | Hand | July 31, 1945 |
| 2,459,519 | Graham et al. | Jan. 18, 1949 |
| 2,497,508 | Michell | Feb. 14, 1950 |
| 2,565,178 | Imbert | Aug. 21, 1951 |
| 2,637,164 | Robson et al. | May 5, 1953 |
| 2,651,493 | Volk | Sept. 8, 1953 |
| 2,667,185 | Beavers | Jan. 26, 1954 |
| 2,780,436 | Holzwarth | Feb. 5, 1957 |

FOREIGN PATENTS

| | | |
|---|---|---|
| 977,692 | France | Nov. 15, 1950 |
| 1,080,835 | France | June 2, 1954 |